United States Patent
Finch et al.

(10) Patent No.: US 7,638,579 B2
(45) Date of Patent: Dec. 29, 2009

(54) CURABLE COMPOSITION

(75) Inventors: William Christopher Finch, Blue Bell, PA (US); Xun Tang, Dresher, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 11/474,240

(22) Filed: Jun. 20, 2006

(65) Prior Publication Data

US 2007/0004835 A1    Jan. 4, 2007

Related U.S. Application Data

(60) Provisional application No. 60/695,762, filed on Jun. 30, 2005.

(51) Int. Cl.
*C08L 33/00* (2006.01)
*C08F 2/16* (2006.01)
*C08K 3/32* (2006.01)

(52) U.S. Cl. .................. 524/845; 524/800; 524/417

(58) Field of Classification Search ............... 524/845, 524/800, 417
See application file for complete search history.

(56) References Cited

U.S. PATENT DOCUMENTS

| 5,318,990 | A |  | 6/1994 | Strauss |
| 5,661,213 | A | * | 8/1997 | Arkens et al. ............... 524/555 |
| 5,763,524 | A |  | 6/1998 | Arkens et al. |
| 6,071,994 | A |  | 6/2000 | Hummerich et al. |
| 6,099,773 | A |  | 8/2000 | Reck et al. |
| 6,136,916 | A |  | 10/2000 | Arkens et al. |
| 6,331,350 | B1 | * | 12/2001 | Taylor et al. ................. 428/221 |
| 6,348,530 | B1 |  | 2/2002 | Reck et al. |
| 6,699,945 | B1 | * | 3/2004 | Chen et al. ................... 525/445 |
| 2003/0008978 | A1 |  | 1/2003 | Chen et al. |
| 2004/0024170 | A1 |  | 2/2004 | Husemoen et al. |
| 2004/0152824 | A1 |  | 8/2004 | Dobrowolski |
| 2004/0254290 | A1 |  | 12/2004 | Rodrigues et al. |
| 2005/0038193 | A1 |  | 2/2005 | Blankenship et al. |

FOREIGN PATENT DOCUMENTS

| EP | 1 510 618 A |  | 3/2005 |
| EP | 1510618 A1 | * | 3/2005 |
| WO | WO 2004/050978 A1 |  | 6/2004 |

* cited by examiner

*Primary Examiner*—Vasu Jagannathan
*Assistant Examiner*—Karuna P Reddy
(74) *Attorney, Agent, or Firm*—Andrew F. C. Merriam

(57) ABSTRACT

A composition that includes a polycarboxy oligomer or co-oligomer and a polyol.

8 Claims, No Drawings

CURABLE COMPOSITION

This non-provisional patent application is claiming priority based on Provisional Patent Application No. 60/695,762, filed Jun. 30, 2005, the disclosure of which is incorporated herein by reference.

This invention relates to a formaldehyde-free curable aqueous composition containing a low molecular weight carboxy oligomer or co-oligomer and a polyol. The composition also preferably includes a phosphorous-containing accelerator, and has a pH no greater than 3.5. The resultant composition, particularly when used as a binder for fiberglass products, provides minimal processing difficulties and products with excellent recovery and rigidity.

Curable aqueous-based compositions containing little or no formaldehyde are highly desirable for use in the manufacture of a variety of products, due to the health and environmental problems commonly associated with formaldehyde, as well as existing and proposed legislation directed to the lowering or elimination of formaldehyde. Formaldehyde-free systems exist that involve reacting a polycarboxy acid polymer with a hydroxyl-containing compound.

Such binders are particularly useful in the manufacture of fiberglass insulation. In making such insulation, the binder composition is sprayed onto the hot glass after the glass is spun into fiber, and the wet glass fibers are dropped onto a foraminous conveyor where some of the water is vacuumed away. However, after vacuum is applied but before the binder is cured, the binder must be able to flow so that the fibers are thoroughly wetted with binder. Thorough wetting allows for the fibers to be joined well together as well as the fibers to be encased in polymer that lends flexibility and strength to the resultant insulation.

One solution that has been proposed to create better polymer flow before cure is to add a surfactant to the system, as taught in U.S. patent application Ser. No. 10/715,087, U.S. Pat. No. 6,071,994 to Hummerich et al. and Reck U.S. Pat. Nos. 6,099,773 and 6,348,530. However, surfactant addition makes the resulting binder more water and humidity sensitive after cure. In the case of fiberglass insulation, humidity sensitivity will reduce the strength of the binder and corrode the glass fiber, weakening it. Water and humidity sensitivity has drawbacks in other uses for such binders as well.

This invention is a binder composition comprising an aqueous solution of an oligomer or co-oligomer of ethylenically-unsaturated carboxylic acid prepared by free radical addition polymerization, having a number average molecular weight of between 300 and 900, and a polyol, wherein the ratio of acid group equivalents to hydroxyl group equivalents is in the range of from about 1/0.1 to 1/1.5. The binder composition pH is preferably no greater than 3.5.

"Oligomer" as used by us means a homopolymer molecule consisting of only a few monomer units (e.g., dimer, trimer, tetramer, etc). "Co-oligomer" as used by us means a copolymer molecule consisting of only a few monomer units (e.g., dimer, trimer, tetramer, etc.). The use of the term "polymer" and "copolymer" as used throughout the disclosure, includes both oligomer and co-oligomer, respectively.

The polymerization reaction to prepare the carboxy oligomer or co-oligomer addition polymer may be initiated by various methods known in the art such as, for example, by using the thermal decomposition of an initiator and by using an oxidation-reduction reaction ("redox reaction") to generate free radicals to effect the polymerization. In another embodiment the addition polymer may be formed in the presence of phosphorous-containing chain transfer agents such as, for example, hypophosphorous acid and its salts, as is disclosed in U.S. Pat. No. 5,077,361, which is hereby incorporated herein by reference, so as to incorporate the phosphorous-containing accelerator and the polyacid component in the same molecule.

Chain transfer agents such as mercaptans, polymercaptans, and halogen compounds can be used in the polymerization mixture in order to moderate the molecular weight of the oligomer composition. Generally, from 0% to 20% by weight, based on the weight of the polymeric binder, of $C_4$-$C_{20}$ alkyl mercaptans, mercaptopropionic acid, or esters of mercaptopropionic acid, can be used.

In one embodiment of the invention, the carboxyl groups of the oligomer composition may be neutralized with a fixed base, meaning a base which is substantially non-volatile under the conditions of the treatment such as, for example, sodium hydroxide, potassium hydroxide, sodium carbonate, or t-butylammonium hydroxide. The fixed base must be sufficiently nonvolatile that it will substantially remain in the composition during heating and curing operations.

In a different embodiment of the invention, the carboxy groups may be neutralized with a volatile base, meaning a base which is substantially volatile under the conditions of treatment of the substrate with the oligomer composition. Suitable volatile bases for neutralization include, for example, ammonia or volatile lower alkyl amines. The volatile base can be used in addition to the fixed base.

In one embodiment of this invention, the curable binder composition comprises a phosphorous-containing accelerator such as those disclosed in U.S. Pat. No. 6,136,916. Preferably, the accelerator is selected from the group consisting of sodium hypophosphite, sodium phosphite, or a mixture thereof. The phosphorous-containing accelerator can also be an oligomer bearing phosphorous-containing groups such as, for example, an oligomer of acrylic acid formed in the presence of sodium hypophosphite by addition polymerization of the present invention with a number average molecular weight of between 300 and 900, but a separate compound from the oligomer or co-oligomer serving as the binder of the curable composition of the present invention. The phosphorous-containing accelerator can be used at a level of from 0% to 40%, preferably from 0% to 30%, further preferably from 0% to 20%, more preferably from 0% to 10% by weight based on the weight of the oligomer or co-oligomer.

Preferably, the number average molecular weight of the oligomer or co-oligomer is between about 500 and about 800.

The preferred polyol is triethanolamine. However, other polyols can be used. The polyol should be sufficiently non-volatile that it will substantially remain available for reaction with the polyacid in the composition during heating and curing operations. The polyol may be a compound with a molecular weight less than about 1000 bearing at least two hydroxyl groups such as, for example, ethylene glycol, glycerol, pentaerythritol, trimethylol propane, sorbitol, sucrose, glucose, resorcinol, catechol, pyrogallol, glycollated ureas, 1,4-cyclohexane diol, diethanolamine, and certain reactive polyols such as, for example, .beta.-hydroxyalkylamides such as, for example, bis-[N,N-di(.beta.-hydroxyethyl)]adipamide, as may be prepared according to the teachings of U.S. Pat. No. 4,076,917, or it may be an addition polymer containing at least two hydroxyl groups such as, for example, polyvinyl alcohol, partially hydrolyzed polyvinyl acetate, and homopolymers or copolymers of hydroxyethyl (meth)acrylate, hydroxypropyl (meth)acrylate, and the like. Preferably, the amounts of oligomer or co-oligomer and the amount of the polyol in the binder is such that the ratio of carboxyl group equivalents to hydroxyl group equivalents is in the range of from about 1/0.1 to 1/1.5.

Preferably, the oligomer or co-oligomer comprises the polymerized units of at least one carboxylic acid selected from the group consisting of acrylic acid and methacrylic acid, or mixtures thereof.

In the case of the co-oligomer, it preferably comprises polymerized units of at least one carboxylic acid selected from the group consisting of acrylic acid and methacrylic acid, and from about 3 to about 25 weight percent, based on the total weight of monomers in the curable composition, of an ethylenically unsaturated monomer having a solubility of less than 2 g/100 g of water at 25° C., wherein said ethylenically unsaturated monomer is selected from the group consisting of ethyl (meth)acrylate, methyl methacrylate, butyl (meth)acrylate, styrene, α-methyl styrene, mono-alkyl (meth)acrylamide, and di-alkyl (meth)acrylamide.

This invention is also a fiberglass binder comprising:
(a) an aqueous solution of carboxy oligomer or co-oligomer having a number average molecular weight of between 300 and 900 prepared by free radical addition polymerization,
(b) polyol, and,
(c) a phosphorous-containing accelerator, wherein the pH of the binder is no greater than 3.5 and the amount of carboxy oligomer or co-oligomer and polyol in the binder is such that the ratio of carboxyl group equivalents to hydroxyl group equivalents is in the range of from about 1/0.1 to 1/1.5.

Preferably, in the fiberglass binder of this invention, the polyol is triethanolamine; further preferably, the binder comprises a strong acid such as, for example, sulfuric acid.

Another aspect of this invention is a curable composition comprising (a) a polyacid co-oligomer comprising as polymerized units, a monomer comprising carboxylic acid groups, anhydride groups, or salts thereof, and from about 3 to about 25 weight percent, based on the total weight of monomers in the curable composition, of an ethylenically unsaturated monomer having a solubility of less than 2 g/100 g of water at 25° C., wherein said ethylenically unsaturated monomer is selected from the group consisting of ethyl (meth)acrylate, methyl methacrylate, butyl (meth)acrylate, styrene, α-methyl styrene, mono-alkyl acrylamide, and di-alkyl acrylamide; having a number average molecular weight less than 1000, and (b) a hydroxyl group-comprising compound bearing at least two hydroxyl groups; wherein the ratio of the number of equivalents of said carboxylic acid groups, anhydride groups, or salts thereof to the number of equivalents of said hydroxyl groups is from about 1/0.1 to about 1/1.5.

The ethylenically unsaturated monomer is at least one of ethyl (meth)acrylate, methyl methacrylate, butyl (meth)acrylate, styrene, α-methyl styrene, mono-alkyl (meth)acrylamide, or di-alkyl (meth)acrylamide. "(Meth)acrylate," means either an acrylate or a methacrylate. "(Meth)acrylamide" means either an acrylamide or a methacrylamide. The ethylenically unsaturated monomer is present in quantities of from about 3 to about 25 weight percent, preferably from about 3 to about 20 weight percent, more preferably from about 3 to about 15 weight percent, based on the total weight of monomer in the curable composition. The preferred amount of each of the ethylenically unsaturated monomers is as follows: from about 10 to about 25 weight percent ethyl (meth)acrylate, from about 10 to about 20 weight percent methyl methacrylate, from about 3 to about 15 weight percent butyl (meth)acrylate, from about 3 to about 15 weight percent styrene, from about 3 to about 15 weight percent α-methyl styrene from about 3 to about 8 weight percent t-octyl acrylamide, and from about 5 to about 15 weight percent t-butyl acrylamide. In those embodiments of the invention in which the ethylenically unsaturated monomer has a solubility in water of less than 1 g/100 g water at 25° C., it is preferred to use from about 3 to about 15 weight percent, based on the total weight of monomers in the curable composition, of the ethylenically unsaturated monomer. In those embodiments of the invention in which the ethylenically unsaturated monomer has a solubility in water of from 1 g/100 g to 2 g/100 g water at 25° C., it is preferred to use from about 10 to about 25 weight percent, based on the total weight of monomers in the curable composition, of the ethylenically unsaturated monomer. Suitable monomers including carboxylic acid groups, and salts thereof include, for example, methacrylic acid, acrylic acid, crotonic acid, fumaric acid, maleic acid, 2-methyl maleic acid, itaconic acid, citraconic acid, mesaconic acid, cyclohexenedicarboxylic acid, 2-methyl itaconic acid, α-methylene glutaric acid, monoalkyl maleates, and monoalkyl fumarates, and salts thereof. Suitable monomers including anhydride groups, and salts thereof, include ethylenically unsaturated anhydrides, such as, for example, maleic anhydride, itaconic anhydride, acrylic anhydride, and methacrylic anhydride, and salts thereof. Preferred monomers including carboxylic acid groups, anhydride groups, or salts thereof, and salts thereof, and maleic anhydride. Preferably, the monomers including carboxylic acid groups, anhydride groups, or salts are used at a level of from 1% to 99%, more preferably at a level of from 10% to 90% by weight, based on the weight of the polymer.

In one embodiment of this invention, a macromolecular organic compound having a hydrophobic cavity is present in the polymerization medium used to form the co-oligomer component of the curable composition. Suitable techniques for using a macromolecular organic compound having a hydrophobic cavity are disclosed in, for example, U.S. Pat. No. 5,521,266. Macromolecular organic compounds having a hydrophobic cavity useful in the present invention include, for example, cyclodextrin or cyclodextrin derivatives; cyclic oligosaccharides having a hydrophobic cavity such as cycloinulohexose, cycloinuloheptose, or cycloinuloctose; calyxarenes; cavitands; or combinations thereof. Preferably, the macromolecular organic compound is β-cyclodextrin, more preferably methyl-β-cyclodextrin.

The oligomer or co-oligomer component has a number average molecular weight, as measured by aqueous GPC, of from 300 to 900. Preferred is a number average molecular weight of from 400 to 900; more preferred is a number average molecular weight of from 500 to 800.

In a preferred embodiment of the invention, the binder composition contains a strong acid. "Strong acid" means a non-carboxylic acid having at least one pKa of no greater than 3. In this embodiment, the binder composition preferably contains from 0.01 to 0.2 equivalents of a strong acid, relative to the equivalents of total carboxylic acid, more preferably from 0.01 to 0.18 equivalents. "Total carboxylic acid" means the entire amount of the carboxylic acid present in the binder composition. The strong acid may be a mineral acid, such as, for example, sulfuric acid, or an organic acid, such as, for example sulfonic acid. Mineral acids are preferred.

In one embodiment of the invention, the binder composition further contains at least one low molecular weight polybasic carboxylic acid, anhydride or salt thereof having a molecular weight of 1000 or less, preferably 500 or less, and most preferably 200 or less. "Polybasic" means having at least two reactive acid or anhydride functional groups. Examples of suitable low molecular weight polybasic carboxylic acids and anhydrides include, for example, maleic acid, maleic anhydride, fumaric acid, succinic acid, succinic anhydride, sebacic acid, azelaic acid, adipic acid, citric acid, glutaric acid, tartaric acid, itaconic acid, trimellitic acid, hemimellitic acid, trimesic acid, tricarballytic acid, 1,2,3,4-butanetetracarboxylic acid, pyromellitic acid, oligomers of carboxylic acid, and the like. Optionally, the low molecular weight polybasic carboxylic acid, anhydride or salt thereof may be mixed with the hydroxyl-containing compound, under reactive conditions, prior to mixing with the polyacid copolymer.

In one embodiment of the invention, the binder composition is blended with an emulsion polymer including, as polymerized units, at least one copolymerized ethylenically-unsaturated nonionic acrylic monomer. "Emulsion polymer" means a polymer dispersed in an aqueous medium that has been prepared by emulsion polymerization techniques known in the art. By "nonionic monomer" herein is meant that the copolymerized monomer residue does not bear an ionic charge between pH=1-14.

The ethylenically unsaturated nonionic acrylic monomers include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate; hydroxyalkyl(meth)acrylate monomers such as 2-hydroxyethyl methacrylate, 2-hydroxyethyl acrylate, 2-hydroxypropyl methacrylate, 1-methyl-2-hydroxyethyl methacrylate, 2-hydroxy-propyl acrylate, 1-methyl-2-hydroxyethyl acrylate, 2-hydroxybutyl methacrylate and 2-hydroxybutyl acrylate. Other ethylenically unsaturated nonionic monomers which may be incorporated into the polymer include vinylaromatic compounds, such as styrene, α-methylstyrene, p-methylstyrene, ethylvinylbenzene, vinylnaphthalene, vinylxylenes, vinyltoluenes, and the like; vinyl acetate, vinyl butyrate and other vinyl esters; vinyl monomers such as vinyl alcohol, vinyl chloride, vinyl toluene, vinyl benzophenone, and vinylidene chloride.

Further ethylenically unsaturated nonionic acrylic monomers include acrylamides and alkyl-substituted acrylamides, such as acrylamide, methacrylamide, N-tert-butylacrylamide and N-methyl(meth)acrylamide; hydroxyl-substituted acrylamides, such as methylolacrylamide, and beta-hydroxyalkylamides.

The emulsion polymer may contain monoethylenically-unsaturated acid monomer, such as, for example, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth)acrylate, phosphoalkyl (meth)acrylates such as phosphoethyl (meth)acrylate, phosphopropyl (meth)acrylate, and phosphobutyl (meth) acrylate, phosphoalkyl crotonates, phosphoalkyl maleates, phosphoalkyl fumarates, phosphodialkyl (meth)acrylates, phosphodialkyl crotonates, and allyl phosphate.

The emulsion polymer used in this invention may contain copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, butadiene, and divinyl benzene.

In a further embodiment of the invention, the binder composition is blended with a predominately hydrophobic emulsion polymer including, as polymerized units, greater than 30%, preferably greater than 40%, more preferably greater than 50%, and even more preferably greater than 60%, by weight, based on the weight of the emulsion polymer solids, of an ethylenically unsaturated acrylic monomer including a $C_5$ or greater alkyl group. "Acrylic monomer including a $C_5$ or greater alkyl group" means an acrylic monomer bearing an aliphatic alkyl group having five or more C atoms, the alkyl group including n-alkyl, s-alkyl, i-alkyl, and t-alkyl groups. Suitable ethylenically unsaturated monomers including a $C_5$ or greater alkyl group include ($C_5$-$C_{30}$) alkyl esters of (meth) acrylic acid, such as amyl (meth)acrylate, 2-ethylhexyl (meth)acrylate, benzyl (meth)acrylate, lauryl (meth)acrylate, oleyl (meth)acrylate, palmityl (meth)acrylate, stearyl (meth) acrylate; unsaturated vinyl esters of (meth)acrylic acid such as those derived from fatty acids and fatty alcohols; surfactant monomers including long chain alkoxy- or alkylphenoxy (polyalkylene oxide) (meth)acrylates, such as $C_{18}H_{37}$-(ethylene oxide)$_{20}$ methacrylate and $C_{12}H_{25}$-(ethylene oxide)$_{23}$ methacrylate; N-alkyl substituted (meth)acrylamides such as octyl acrylamide; and the like. The monomer including a $C_5$ or greater alkyl group can also contain functionality, such as amido, aldehyde, ureido, polyether and the like, but preferably does not contain an acid or hydroxy group. Emulsion polymers containing such monomers can be prepared by emulsion polymerization, preferably by the method for forming polymers of U.S. Pat. No. 5,521,266. A surfactant may be added to the emulsion polymer before or during the blending of the emulsion polymer with the copolymer composition. If a surfactant is added, it can be added in the amount of from 0.5% to 20%, preferably from 2% to 10%, by weight, based on the weight of emulsion polymer solids. When added, the surfactant preferably has a HLB value of greater than 15.

The predominately hydrophobic emulsion polymer can also include, as copolymerized units, from 0% to 10%, preferably from 0% to 5%, by wt based on the weight of the emulsion polymer solids, monomer bearing a carboxylic acid group, anhydride group, or salt thereof or hydroxyl-group, such as (meth)acrylic acid and hydroxyethyl(meth)acrylate. The emulsion polymer may be present in an amount of from 1% to 10%, preferably from 1.5% to 5%, by weight based on the weight of the binder composition, on a solids basis.

The binder composition can contain, in addition, conventional treatment components such as, for example, pigments; fillers or extenders; anti-migration aids; curing agents; coalescents; surfactants, particularly nonionic surfactants; spreading agents; mineral oil dust suppressing agents; biocides; plasticizers; organosilanes; anti-foaming agents such as dimethicones, silicone oils and ethoxylated nonionics; corrosion inhibitors, particularly corrosion inhibitors effective at pH<4 such as thioureas, oxalates, and chromates; colorants; antistatic agents; lubricants; waxes; anti-oxidants; coupling agents such as silanes, particularly Silquest™ A-187 (manufactured by GE Silicones—OSi Specialties, located in Wilton Conn.); polymers not of the present invention; and waterproofing agents such as silicones.

However, it is preferred to use as little surfactant as possible, for the reasons explained previously.

The binder composition of this invention is preferably a formaldehyde-free copolymer composition. "Formaldehyde-free" means that the composition is substantially free from formaldehyde, nor does it liberate substantial formaldehyde as a result of drying and/or curing. To minimize the formaldehyde content of the binder composition it is preferred, when preparing a polymer of the present invention, to use polymerization adjuncts such as, for example, initiators, reducing agents, chain transfer agents, biocides, surfactants, and the like, which are themselves free from formaldehyde, do not generate formaldehyde during the polymerization process, and do not generate or emit formaldehyde during the treatment of a substrate. "Substantially free from formaldehyde" means that when low levels of formaldehyde are acceptable in the waterborne composition or when compelling reasons exist for using adjuncts which generate or emit formaldehyde, substantially formaldehyde-free waterborne compositions can be used.

The composition of this invention may be used for treating a substrate. Such treatments can be commonly described as, for example, coating, sizing, saturating, bonding, combinations thereof, and the like. Typical substrates include wood, including, for example, solid wood, wood particles, fibers, chips, flour, pulp, and flakes; metal; plastic; fibers such as glass fibers; woven and non-woven fabrics; and the like. The binder composition can be applied to a substrate by conventional techniques such as, for example, air or airless spraying, padding, saturating, roll coating, curtain coating, beater deposition, coagulation, or the like.

In one embodiment of this invention, the composition of this invention can be used as a binder for heat-resistant non-woven fabrics such as, for example, non-wovens which contain heat-resistant fibers such as, for example, aramid fibers, ceramic fibers, metal fibers, carbon fibers, polyimide fibers, certain polyester fibers, rayon fibers, rock wool, and glass fibers. "Heat-resistant fibers" mean fibers which are substantially unaffected by exposure to temperatures above 125° C. Heat-resistant non-wovens can also contain fibers that are not in themselves heat-resistant such as, for example, certain polyester fibers, rayon fibers, nylon fibers, and super-absorbent fibers, in so far as they do not materially adversely affect the performance of the substrate.

Non-woven fabrics are composed of fibers which can be consolidated by purely mechanical means such as, for example, by entanglement caused by needle-punching, by an air-laid process, and by a wet-laid process; by chemical means such as, for example, treatment with a polymeric binder; or by a combination of mechanical and chemical means before, during, or after non-woven fabric formation. Some non-woven fabrics are used at temperatures substantially higher than ambient temperature such as, for example, glass fiber-containing non-woven fabrics which are impregnated with a hot asphaltic composition pursuant to making roofing shingles or roll roofing material. When a non-woven fabric is contacted with a hot asphaltic composition at temperatures of from 150° C. to 250° C., the non-woven fabric can sag, shrink, or otherwise become distorted. Therefore, non-woven fabrics which incorporate a copolymer composition should substantially retain the properties contributed by the cured aqueous composition such as, for example, tensile strength. In addition, the cured composition should not substantially detract from essential non-woven fabric characteristics, as would be the case, for example, if the cured composition were too rigid or brittle or became sticky under processing conditions.

The aqueous binder composition, after it is applied to a substrate, is heated to effect drying and curing. The duration and temperature of heating will affect the rate of drying, processability, handleability; and property development of the treated substrate. Heat treatment at from 120° C. to 400° C. for a period of time between from 3 seconds to 15 minutes can be carried out; treatment at from 175° C. to 225° C. is preferred. By "curing" is meant herein a chemical or morphological change which is sufficient to alter the properties of the polymer such as, for example, via covalent chemical reaction, ionic interaction or clustering, improved adhesion to the substrate, phase transformation or inversion, hydrogen bonding, and the like. The drying and curing functions can be performed in two or more distinct steps, if desired. For example, the composition can be first heated at a temperature and for a time sufficient to substantially dry but not to substantially cure the composition, and then heated for a second time at a higher temperature and/or for a longer period of time to effect curing. Such a procedure, referred to as "B-staging", can be used to provide binder-treated nonwoven, for example, in roll form, which can at a later stage be cured, with or without forming or molding into a particular configuration, concurrent with the curing process.

The heat-resistant non-wovens can be used for applications such as, for example, insulation batts or rolls, as reinforcing mat for roofing or flooring applications, as roving, as micro-glass-based substrate for printed circuit boards or battery separators, as filter stock, as tape stock, and as reinforcement scrim in cementitious and non-cementitious coatings for masonry, in ceiling tiles, cellulosic roofing tiles, window treatments, wall coverings, molded parts, for curly pulp modification, for powder coating, and the like.

The following examples are intended to illustrate the method of preparing compositions of this invention, and a prior art control.

EXAMPLE 1

Comparative Control Polymer 1: 9% SHP

To a five liter four neck flask equipped with a mechanical stirrer, a condenser, a nitrogen sweep, a thermometer and inlets for the gradual additions of monomer, initiator and sodium hypophosphite ("SHP") solutions, was added 1217.7 grams of deionized (DI) water. A chain regulator stock solution was prepared by dissolving 2500 grams of sodium hypophosphite monohydrate in 3056 grams of deionized water. A total of 406.99 grams was removed from the stock solution and 30% by weight (122.1 grams) of this solution was added to the water charge and heated to 93° C. The remaining 70% by weight (284.89 grams) of the chain regulator solution was used as co-feed solution. A monomer charge of 2034.9 grams of glacial acrylic acid was prepared. An initiator solution was prepared by dissolving 20.35 grams of sodium persulfate in 45.3 grams of DI water.

The acrylic acid, sodium persulfate and sodium hypophosphite charges were added separately at constant feed rate over two hours to the stirring water charge. Temperature was maintained at 93°±1° C.

The resultant polymer solution was allowed to cool to room temperature, then diluted with 492.66 grams of DI water. The solution had a solids content of 53.34%, pH of 2.8, viscosity of 360 centipoises and residual monomer content of less than 0.01%. The number average molecular weight ("$M_n$") was 1280.

EXAMPLE 2

Oligomer 2 of the Invention: 14% SHP

The procedure of Example 1 was repeated except that the amount of DI water added to the reactor was 72.4 grams and the amount of chain regulator stock solution added to both the reactor water charge and co-feed charge was 189.2 grams.

The resultant polymer had a solids content of 53.29%, pH of 2.96, viscosity of 380 centipoises and residual monomer content of less than 0.01%. The $M_n$ by GPC was 830.

EXAMPLE 3

Oligomer 3 of the Invention: 18% SHP

To a three liter four neck flask equipped with a mechanical stirrer, a condenser, a nitrogen sweep, a thermometer and inlets for the gradual additions of monomer, initiator and sodium hypophosphite solutions, was added 710 grams of deionized (DI) water. A chain regulator stock solution was prepared by dissolving 2500 grams of sodium hypophosphite monohydrate in 3056 grams of DI water. A total of 486.4 grams was removed form the stock solution and half of this solution (243.2 grams) was added to the water charge and heated to 93° C. The remaining half of the chain regulator solution was used as co-feed solution. A monomer charge of 1216 grams of glacial acrylic acid was prepared. An initiator solution was prepared by dissolving 12.16 grams of sodium persulfate in 30.7 grams of DI water.

The acrylic acid, sodium persulfate and sodium hypophosphite charges were added separately at constant feed rate over two hours to the stirring water charge. Temperature was maintained at 93°±1° C.

The resultant polymer solution was allowed to cool to room temperature, then diluted with 274 grams of DI water. The solution had a solids content of 52.71%, pH of 3.2, viscosity of 210 centipoises and residual monomer content of less than 0.01%. $M_n$ by GPC was 660.

EXAMPLE 4

Preparation of Curable Aqueous Compositions

We made three different curable aqueous binder compositions using the polymer prepared in Example 1 and the oligomers prepared in Examples 2 and 3 as shown in Table 1. In each of them, we mixed the acrylic acid oligomers of the invention and polymer control with triethanolamine. The pH of each mixture was then adjusted to 3.0 with concentrated sulfuric acid, then diluted with water to constant weight solids of 50.0%. The active ingredients were 50.0% (active ingredients are all components other than water).

TABLE 1

Preparation of curable aqueous binder compositions

| Formulation | Polymer/Oligomer (gr) | TEA[1](gr.) | $H_2SO_4$[2](gr.) | water (gr.) |
|---|---|---|---|---|
| 1. | 95.1 ($M_n$ = 1,280; 52.1% solids)[3] | 17.4 | 3.2 | 23.8 |
| 2. | 97.1 ($M_n$ = 830; 53.3% solids) | 17.4 | 3.7 | 26.5 |
| 3. | 101.6 ($M_n$ = 660; 52.7% solids) | 17.4 | 3.7 | 25.5 |

[1]triethanolamine, 98%
[2]sulfuric acid, 96%
[3]Formulation 1 is prior art

Sward Film Surface Hardness Results

To determine the Sward film hardness for each of formulations described in Table 1, the following procedure was used. Each of formulations 1, 2 and 3 was drawn down at a wet thickness of 5 mils on a clean glass plate. Once cast, each film was immediately placed on a level surface in a vacuum oven and dried for 35 minutes at 90° C. The films were then removed and let cool at room temperature in a low humidity chamber (<30% relative humidity) to equilibrate for various periods of time shown in Table 2. The surface hardness of each film was then tested using a Sward type hardness rocker and leveling table following the procedure in ASTM D2134-93 (2001). The number of oscillations for each film is recorded in Table 2. The greater the number of oscillations, the harder the film surface. The lesser the number of oscillations, the softer the film surface.

TABLE 2

Sward Film Hardness Results (Number of Oscillations)

| | Equil. Time (min.) | | |
|---|---|---|---|
| Formulation | 10 | 15 | 20 |
| 1 (Prior art) | 28 | 14 | 4 |
| 2 | 14 | 2 | 0 |
| 3 | 10 | 2 | 0 |

In practice, the softer the polymer, the greater it will flow onto the substrate to which is will be applied while it is still in a liquid or semi-liquid state before it is cured. This means that in the case of spun glass fiber surfaces that before cure, the binder containing the softer material will flow better across the fibers, leading to a more uniform application of binder material.

We claim:

1. A curable aqueous composition, comprising an aqueous solution of an oligomer or co-oligomer of ethylenically-unsaturated carboxylic acid prepared by free radical addition polymerization, the oligomer or co-oligomer having a number average molecular weight of between 300 and 900,
   and a polyol, wherein the ratio of acid group equivalents to hydroxyl group equivalents is in the range of from about 1/0.1 to 1/1.5,
      wherein the oligomer or co-oligomer is prepared by free radical addition polymerization of ethylenically unsaturated carboxylic acids selected from the group consisting of acrylic acid, methacrylic acid, maleic acid, salts thereof and mixtures thereof, or the co-oligomer comprises the polymerized units of at least one carboxylic acid selected from the group consisting of acrylic acid and methacrylic acid, and from about 3 to about 25 weight percent, based on the total weight of monomers in the curable composition, of an ethylenically unsaturated monomer having a solubility of less than 2 g/100 g of water at 25° C. and, further wherein, the ethylenically unsaturated monomer is selected from the group consisting of ethyl (meth)acrylate, methyl methacrylate, butyl (meth)acrylate, styrene, α-methyl styrene, mono-alkyl (meth)acrylamide, and di-alkyl (meth)acrylamide.

2. A curable aqueous composition of claim 1, wherein its pH is no greater than 3.5.

3. The curable aqueous composition of claim 1 further comprising a phosphorous-containing accelerator.

4. The curable aqueous composition of claim 1, wherein the number average molecular weight of the oligomer or co-oligomer is from 500 to 800.

5. The curable aqueous composition of claim 3 wherein the accelerator is selected from the group consisting of sodium hypophosphite, sodium phosphite, or a mixture thereof.

6. The curable aqueous composition of claim 1, wherein the polyol is triethanolamine.

7. The curable aqueous composition of claim 1, wherein the amount by weight of the oligomer or co-oligomer is greater than 40 percent of the combined weight of the oligomer or co-oligomer and the polyol.

8. The curable aqueous composition of claim 1 further comprising an emulsion polymer.

* * * * *